:::info
Patented July 12, 1949

2,475,864
:::

UNITED STATES PATENT OFFICE 2,475,864

ELECTRIC RESISTANCE ELEMENT

Evert Johannes Willem Verwey, Pieter Willem Haayman, and Arie Bol, Eindhoven, Netherlands, assignors, by mesne assignments, to Hartford National Bank and Trust Company, Hartford, Conn., as trustee No Drawing. Application April 8, 1946, Serial No. 660,422. In the Netherlands March 29, 1944

Section 1, Public Law 690, August 8, 1946
Patent expires March 29, 1964

5 Claims. (Cl. 201—76)

For the manufacture of sintered electric resistances it has been suggested before to start with combinations of $FeO—Fe_2O_3—MgO—Al_2O_3$ and to sinter them at such a temperature and such a partial pressure of the oxygen of the surrounding atmosphere and to cool them in such manner that between the total quantities of the bivalent and trivalent oxides there is a molecular ratio which differs so little from 1 that a homogeneous spinel phase results, which at a temperature of about 500° C. is not supersaturated with a second phase.

Apart from the fact that the temperature coefficient of resistances thus manufactured is very highly negative with a given resistance value, these resistances, when loaded in vacuo or in a neutral gas, whereby temperatures of about 1200° C. are reached, do not exhibit any chemical conversions that cause a change of the resistance value. Even in the case of loading in air comparatively high temperatures are still permissible, since these materials are not going to react with the oxygen of the air with appreciable speed until at temperatures exceeding 700° C. A limitation in the manufacture of these resistances was, however, the sintering temperature required for the obtainment of a sufficiently homogeneous and dense product which ranged between 1500 and 1600° C. and which was so high as to be a source of trouble in practice. This disadvantage could be slightly lessened by the use of a sintering agent, but with a view to securing the desired resistance properties only small quantities thereof could be added.

According to the invention the sintering temperature can be reduced appreciably, to wit to about 1400° C., if the alumina in the aforesaid combinations is replaced by chromium oxide.

The invention consists in a sintered, electric resistance having a negative temperature coefficient and built up substantially from

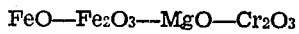
$FeO—Fe_2O_3—MgO—Cr_2O_3$ constituted by a homogeneous spinel phase which at a temperature of about 500° C. is not supersaturated with a second phase. For this purpose, there must generally be between the total quantities of bivalent and trivalent oxides a molecular ratio which differs little or does not differ at all from 1.

Thus, at operating temperatures exceeding 500° C. no separation of a second phase can occur, which might bring about undue changes in resistance. As far as the range below 500° C. is concerned, it must be observed that in this case the speed of separation of a second phase in the resistance material according to the invention is very low. According to the invention, in connection with the above, the sintering conditions, to wit the temperature and the partial pressure of the oxygen in the surrounding gas are chosen, so as to adjust the molecular ratio $FeO:Fe_2O_3$ required for the said conditions in the mass. In order that this ratio may be maintained as well as possible during the then following cooling, it is desirable for the cooling to be rapidly effected. If, for example owing to the size of the product formed, this is impossible, cooling should be carried out in an atmosphere in which oxidation or reduction does not occur.

The fact that according to the invention a lower sintering temperature can be used is connected inter alia with the fact that for magnesium chromite which, like magnesium aluminate, is not oxidizable or reduceable per se, the temperatures required for the obtainment of speeds of reaction and diffusion which, when sintering, are sufficiently high for the obtainment of a homogeneous mixed crystal, are lying slightly lower. In addition, $MgCr_2O_4$ in the mixed crystal with $Fe_3O_4$ has a slightly stronger increasing effect on the electric resistance than $MgAl_2O_4$, so that the adjustment of a given desired resistance value requires a higher percentage of $Fe_3O_4$. Since, in addition, $Fe_3O_4$ has a lower sintering temperature than $MgCr_2O_4$, this also results in a reduction of the sintering temperature of the chromite mixtures as against that of aluminate mixtures of corresponding similar resistance. In spite thereof, the resistance materials according to the invention are not appreciably less capable of resisting high load than those according to the prior proposal.

With materials according to the invention, variations in partial pressure of the oxygen of the sintering atmosphere, as they may occur during manufacture cause only slight discrepancies in the value of the specific resistance and from the technical viewpoint this results in the advantage of a higher reproduceability when sintering. In this respect also, chromite mixtures are slightly more favourable than aluminate mixtures.

As the ratio $FeO:Fe_2O_3$ is controlled by the choice of the gaseous atmosphere and the sintering temperature, all the forms of iron oxides and, as the case may be, iron powder, are suitable to constitute the starting materials for the resistances according to the invention. Preferably use is initially made of mixtures comprising $Fe_3O_4$. In this case if the molecular ratio $MgO:Cr_2O_3$ is chosen in the neighbourhood of 1, no exchange of oxygen with the surrounding gaseous atmosphere need take place when sintering and this assists in the homogeneity of the product.

In addition, the oxides comprised in the mixed crystals can be isomorphously replaced to a small extent by other oxides without any appreciable effect on the resistance properties. The effect of the invention also occurs, if to a less extent, if in the aforesaid combinations of $$FeO—Fe_2O_3—MgO—Al_2O_3$$

only part of the $Al_2O_3$ is replaced by $Cr_2O_3$. If desired for reasons of manufacture, a low quantity of a sintering agent may be used.

The resistances according to the invention may be used, for example, to eliminate voltage pulses and to constitute neutralizing resistances.

For the manufacture of a resistance according to the invention the following method may, for example, be adopted.

MgO and $Cr_2O_3$ in a molecular ratio of 1:1 are ground with alcohol in an iron ball mill for four hours. In addition, the constitution of the starting mixture is chosen so as to secure a material, in which the ratio between the number of grammolecules $MgO+Cr_2O_3$ (calculated as $MgCr_2O_4$) and the number of grammolecules $Fe_3O_4$ is 2:1. After drying, heating is effected in an enclosure in nitrogen for one hour at 1300° C. for the formation of mixed crystals. Then again grinding is done for four hours and after that the material is compressed to form wires having a diameter of 0.3 mm. with the use of an organic binder, for example polymetacrylacid methylester. The skeins obtained are divided into lengths of about 200 mms., which are heated for 30 minutes at 1400° C. (while hanging) in a flow of 2 liter of nitrogen comprising from 1 to 2 percent by volume of $O_2$ per minute. After the sintering process cooling is rapidly effected by transfer to a cold part of the furnace.

Resistances according to the invention permit of having leading-in wires connected to them without any troublesome contact resistances occurring if these supply wires are fitted in several turns about the ends of the resistance and connected thereto with the use of a carbonic paste, such as is known, for example, for cementing filaments in carbon filament lamps.

Resistances according to the invention, for example if dimensioned as aforesaid, may be used in addition as voltage stabilizers. As compared with the well-known resistances having a negative temperature coefficient, if used in this manner, they can be used in a larger current range in connection with their higher resistance to high temperatures. Thus, for example, a resistance rod having a constitution of 2 grammolecules $MgCr_2O_4$ on 1 grammolecule $Fe_3O_4$ and being made as described before, which after sintering has a thickness of 0.26 mm. and a length of 2 cms. and which is provided in the aforesaid manner with nickel current supply wires being 150$\mu$ in thickness and is housed in a glass bulb exhibits a very flat characteristic curve in the case of loads in vacuo between 15 and 40 ma. In a gaseous atmosphere, for example, nitrogen under a pressure of 30 cms., the resistance can be loaded to a higher extent by reason of the more intense cooling, thus exhibiting a flat characteristic curve between 35 and 65 ma. In the two cases the voltage variations are smaller than 1%. The highest load limit in nitrogen is about 70 ma. and this comes to a load of about 3 w. per cm. of length. At 20° C. the resistance is about 2.5 megohms. At the said highest load of 70 ma. it falls to about 1100 ohms. In this case the externally measured "black" temperature of the hottest part of the resistance rod has risen to about 1100° C.

What we claim is:

1. A negative temperature coefficient resistance element consisting essentially of a homogeneous mixed crystal constituted by a homogeneous spinel phase of FeO, $Fe_2O_3$, MgO and $CR_2O_3$, said mixed crystal being less than supersaturated with a second phase at a temperature of approximately 500° C.

2. A negative temperature coefficient resistance element consisting essentially of a homogeneous mixed crystal constituted by a homogeneous spinel phase of FeO, $Fe_2O_3$, MgO and $Cr_2O_3$ in which the molar ratio between the MgO and the $Cr_2O_3$ is approximately unity, said mixed crystal being less than supersaturated with a second phase at a temperature of approximately 500° C.

3. A negative temperature coefficient resistance element consisting essentially of a mixed crystal constituted by a homogeneous spinel phase of $Fe_3O_4$, MgO, and $Cr_2O_3$ in which the molar ratio between the MgO and the $Cr_2O_3$ is approximately unity, said mixed crystal being less than supersaturated with a second phase at a temperature of approximately 500° C.

4. A method of manufacturing a negative temperature coefficient resistance element, comprising the steps of intimately mixing powdered FeO, $Fe_2O_3$, MgO, and $Cr_2O_3$ in a molar ratio of approximately unity between the MgO and the $Cr_2O_3$ and a molar ratio of approximately 2:1 between the MgO and $Cr_2O_3$ and the FeO and $Fe_2O_3$, sintering said mixture at a temperature of approximately 1400° C. in a nitrogen atmosphere, and rapidly cooling said heated mixture so that the molar ratio between the $Cr_2O_3$ and the MgO is maintained at approximately unity and a homogeneous spinel phase is achieved which is less than supersaturated with a second phase at a temperature of approximately 500° C.

5. A method of manufacturing a negative temperature coefficient resistant element, comprising the steps of intimately mixing powdered $Fe_3O_4$, MgO, and $Cr_2O_3$ in a molar ratio of approximately unity between the MgO and the $Cr_2O_3$ and a molar ratio of approximately 2:1 between the MgO and $Cr_2O_3$ and the $Fe_3O_4$, sintering said mixture at a temperature of approximately 1300° C. in a nitrogen atmosphere, and rapidly cooling said heated mixture so that the molar ratio between the $Cr_2O_3$ and the MgO is maintained at approximately unity and a homogeneous spinel phase is achieved which is less than supersaturated with a second phase at a temperature of approximately 500° C.

EVERT JOHANNES WILLEM VERWEY.
PIETER WILLEM HAAYMAN.
ARIE BOL.

REFERENCES CITED

The following references are of record in the file of this patent:

UNITED STATES PATENTS

| Number | Name | Date |
| --- | --- | --- |
| 648,518 | Ochs | May 1, 1900 |
| 860,997 | Steinmetz | July 23, 1907 |
| 2,140,228 | Henke | Dec. 13, 1938 |
| 2,252,317 | Goldschmidt | Aug. 12, 1941 |
| 2,258,646 | Grisdale | Oct. 14, 1941 |
| 2,370,443 | Biefeld | Feb. 27, 1945 |